United States Patent
Lu et al.

(10) Patent No.: US 11,547,112 B2
(45) Date of Patent: Jan. 10, 2023

(54) SOLVENTS FOR AGRICULTURAL APPLICATIONS AND PESTICIDE FORMULATIONS

(71) Applicant: Dow Global Technologies LLC, Midland, MI (US)

(72) Inventors: Wei Lu, Shanghai (CN); Hua Ren, Shanghai (CN); Ling Zhong, Shanghai (CN); Jianhai Mu, Shanghai (CN); Dong Yun, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 211 days.

(21) Appl. No.: 16/638,410

(22) PCT Filed: Nov. 3, 2017

(86) PCT No.: PCT/CN2017/109241
§ 371 (c)(1),
(2) Date: Feb. 11, 2020

(87) PCT Pub. No.: WO2019/084894
PCT Pub. Date: May 9, 2019

(65) Prior Publication Data
US 2021/0392876 A1    Dec. 23, 2021

(51) Int. Cl.
*A01N 25/02* (2006.01)
*A01P 15/00* (2006.01)
*A01N 43/56* (2006.01)
*A01N 43/60* (2006.01)
*A01N 43/647* (2006.01)
*A01N 43/653* (2006.01)

(52) U.S. Cl.
CPC .............. *A01N 25/02* (2013.01); *A01N 43/56* (2013.01); *A01N 43/60* (2013.01); *A01N 43/647* (2013.01); *A01N 43/653* (2013.01); *A01P 15/00* (2021.08)

(58) Field of Classification Search
CPC ...... A01N 25/02; A01N 43/60; A01N 43/653; A01N 43/647; A01P 15/00
See application file for complete search history.

(56) References Cited

U.S. PATENT DOCUMENTS

| 5,397,795 A * | 3/1995 | Valcke ................ A01N 43/653 514/383 |
| 2014/0113236 A1* | 4/2014 | Senzaki ................. G03F 7/038 430/325 |
| 2015/0264923 A1 | 9/2015 | Schneider |
| 2016/0198716 A1 | 7/2016 | Pirotte |

FOREIGN PATENT DOCUMENTS

| CN | 101971824 | 2/2011 |
| CN | 102283195 | 12/2011 |
| CN | 104145950 | 11/2014 |
| CN | 107094777 | 8/2017 |
| ES | 2258570 | 9/2006 |
| JP | 05898192 B2 | 4/2016 |
| WO | 9800008 | 1/1998 |
| WO | 2005000023 | 1/2005 |
| WO | 2013126948 | 9/2013 |

OTHER PUBLICATIONS

Kozuki., A predictive solubility tool for pesticide emulsifiable concentrate formulations ASTM Special Technical Publication 2009 70-76 9.
PCT/CN2017/109241, International Search Report and Written Opinion dated May 16, 2018.

* cited by examiner

*Primary Examiner* — Johann R Richter
*Assistant Examiner* — Danielle Sullivan

(57) ABSTRACT

Embodiments of the present invention relate to solvents for agricultural applications and pesticide formulations. In one aspect, a solvent for agricultural applications comprises (a) a first component consisting of a polar solvent wherein the polar solvent is a sulfoxide, N-methyl-2-pyrrolidone, γ-butyrolactone, or a combination thereof; (b) a second component consisting of a glycol ether, and (c) a third component consisting of an ether ester of Formula 1:

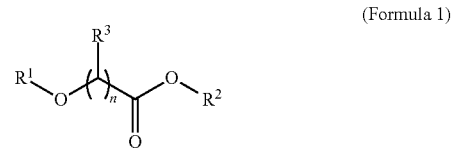

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6.

4 Claims, No Drawings

SOLVENTS FOR AGRICULTURAL APPLICATIONS AND PESTICIDE FORMULATIONS

FIELD

The present invention relates to solvents for agricultural applications (e.g., pesticides) and to pesticide formulations.

INTRODUCTION

A large number of active ingredients are used in the agriculture industry for a variety of purposes including, for example, pesticides. A particular active ingredient needs to be used with a solvent that provides excellent dissolution performance. A variety of solvents have been regularly utilized in agricultural applications depending on the active ingredient. Identifying a particular solvent to use with an active ingredient can be a time-consuming process.

Thus, it would be desirable to have new solvents for agricultural applications having good dissolution properties for a broad range of active ingredients.

SUMMARY

The present invention provides solvents for agricultural applications, such as pesticides, that, in some embodiments, have good dissolution properties for a broad range of active ingredients.

In one aspect, the present invention provides a solvent for agricultural applications that comprises (a) a first component consisting of a polar solvent wherein the polar solvent is a sulfoxide, N-methyl-2-pyrrolidone, γ-butyrolactone, or a combination thereof; (b) a second component consisting of a glycol ether; and (c) a third component consisting of an ether ester of Formula 1:

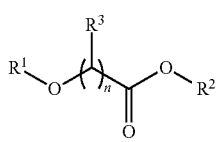

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6.

In another aspect, the present invention provides a pesticide formulation that comprises a solvent according to any of the embodiments of the present invention disclosed herein and a pesticide.

In another aspect, the present invention provides a pesticide formulation that comprises (a) 16 to 55 weight percent of dimethyl sulfoxide; (b) 20 to 30 weight percent of glycol ether; (c) 20 to 40 weight percent of ether ester; and (d) 2 to 70 weight percent of pesticide.

These and other embodiments are described in more detail in the Detailed Description.

DETAILED DESCRIPTION

As used herein, "a," "an," "the," "at least one," and "one or more" are used interchangeably. Thus, for example, an aqueous composition that includes particles of "a" hydrophobic polymer can be interpreted to mean that the composition includes particles of "one or more" hydrophobic polymers.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Solvent" and like terms mean a substance that is capable of dissolving another substance (i.e., a solute) to form an essentially uniformly dispersed mixture (i.e., solution) at the molecular or ionic size level.

Embodiments of the present invention relate to solvents for agricultural applications. In some embodiments, a solvent for agricultural applications comprises:

(a) a first component consisting of a polar solvent wherein the polar solvent is a sulfoxide, N-methyl-2-pyrrolidone, γ-butyrolactone, or a combination thereof;

(b) a second component consisting of a glycol ether; and (c) a third component consisting of an ether ester of Formula 1:

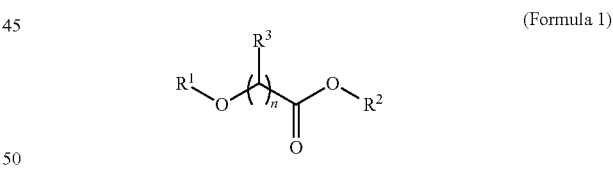

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6. In some embodiments, $R^1$ and $R^2$ are ethyl groups, $R^3$ is hydrogen, and n is 2.

In some embodiments, the first component comprises dimethyl sulfoxide.

In some embodiments, the glycol ether comprises ethylene glycol monobutyl ether, ethylene glycol monopropyl ether, ethylene glycol monohexyl ether, diethylene glycol monoethyl ether, diethylene glycol monomethyl ether, diethylene glycol monobutyl ether, diethylene glycol monohexyl ether, propylene glycol monomethyl ether, dipropylene glycol monomethyl ether, tripropylene glycol monomethyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, propylene glycol diacetate, dipropylene glycol dimethyl ether, or diethylene glycol n-butyl ether acetate. In some embodiments, the glycol ether comprises diethylene glycol monoethyl ether.

In some embodiments, the weight ratio of the polar solvent to the glycol ether to the ether ester (polar solvent: glycol ether:ether ester) is 0.8-2.0:1.0:1.0-2.0.

Embodiments of the present invention also relate to pesticide formulations. In some embodiments, a pesticide formulation comprises a pesticide and a solvent according to any of the embodiments disclosed herein. In some embodiments of pesticide formulations, the polar solvent comprises 16 to 55 weight percent of the formulation, the glycol ether comprises 20 to 30 weight percent of the formulation, the ether ester comprises 20 to 40 weight percent of the formulation, and the pesticide comprises 2 to 70 weight percent of the formulation. In some embodiments of pesticide formulations, the polar solvent comprises 30 to 50 weight percent of the formulation, the glycol ether comprises 22 to 28 weight percent of the formulation, the ether ester comprises 20 to 40 weight percent of the formulation, and the pesticide comprises 10 to 60 weight percent of the formulation. In some embodiments, the pesticide comprises one or more of tebuconazole, difenoconazole, triazolone, quizalofop-p-ethyl, myclobutanil, and pyraclostrobin.

In some embodiments, a pesticide formulation comprises 16 to 55 weight percent of dimethyl sulfoxide, 20 to 30 weight percent of glycol ether, 20 to 40 weight percent of ether ester, and 2 to 70 weight percent of pesticide.

Solvents for Agricultural Applications

Solvents for agricultural applications according to some embodiments of the present invention comprise a first component consisting of a polar solvent wherein the polar solvent is a sulfoxide, N-methyl-2-pyrrolidone, γ-butyrolactone, or a combination thereof; a second component consisting of a glycol ether; and (c) a third component consisting of an ether ester of Formula 1 an ether ester of Formula 1:

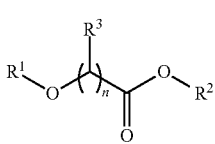

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6. In some embodiments, $R^1$ and $R^2$ are ethyl groups, $R^3$ is hydrogen, and n is 2. In some embodiments, such solvents are used for pesticides.

(1) Polar Solvent

The polar solvent of the solvent for agricultural applications (e.g., pesticides) can be a sulfoxide, N-methyl-2-pyrrolidone, γ-butyrolactone, or a combination thereof.

In some embodiments, the polar solvent component of a solvent for agricultural applications (e.g., pesticides) consists of, or is, a sulfoxide, i.e., a compound containing a sulfonyl functional group attached to two carbon atoms. It is a polar functional group. Sulfoxides are the oxidized derivatives of sulfides. Representative sulfoxides include, but are not limited to, diethyl sulfoxide, butyl sulfoxide, tetramethylene sulfoxide and dimethyl sulfoxide (DMSO). The first component can consist of one or more sulfoxides. In one embodiment the first component consists of one sulfoxide. In one embodiment the first component consists of two or more sulfoxides. In one embodiment the first component consists of, or is, DMSO (CAS Number 67-68-5).

In some embodiments, the polar solvent consists of, or is, N-methyl-2-pyrrolidone (CAS Number 872-50-4).

In some embodiments, the polar solvent consists of, or is, γ-butyrolactone (CAS Number 96-48-0).

In some embodiments, the polar solvent consists of a combination of a sulfoxide (as described above) and/or N-methyl-2-pyrrolidone and/or γ-butyrolactone.

In some embodiments, solvents of the present invention comprise or consist essentially of 16 to 55 weight percent of the polar solvent. Solvents of the present invention, in other embodiments, comprise or consist essentially of 30 to 50 weight percent of the polar solvent.

In some embodiments, the polar solvent consists of a sulfoxide. In some such embodiments, the solvent consists of 16 to 55 weight percent sulfoxide. The solvent consists of 30 to 50 weight percent sulfoxide in some embodiments.

(2) Glycol Ether

The second component of the solvent for agricultural applications (e.g., pesticides) of the present invention consists of, or is, a glycol ether, i.e., a compound based on an alkyl ether of ethylene glycol or propylene glycol. These solvents typically have a higher boiling point, together with the favorable solvent properties of lower-molecular weight ethers and alcohols. Representative glycol ethers include, but are not limited to, ethylene glycol monobutyl ether, ethylene glycol monopropyl ether, ethylene glycol monohexyl ether, diethylene glycol monoethyl ether, diethylene glycol monomethyl ether, diethylene glycol monobutyl ether, diethylene glycol monohexyl ether, propylene glycol monomethyl ether, dipropylene glycol monomethyl ether, tripropylene glycol monomethyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, propylene glycol diacetate, dipropylene glycol dimethyl ether, or diethylene glycol n-butyl ether acetate. Examples of commercially available glycol ethers that can be used in some embodiments of the present invention include those commercially available from The Dow Chemical Company such as Butyl CELLUSOLVE™ ethylene glycol monobutyl ether, Propyl CELLUSOLVE™ ethylene glycol monopropyl ether, Hexyl CELLUSOLVE™ ethylene glycol monohexyl ether, CARBITOL™ diethylene glycol monoethyl ether, Methyl CARBITOL™ diethylene glycol monomethyl ether, Butyl CARBITOL™ diethylene glycol monobutyl ether, Hexyl CARBITOL™ diethylene glycol monohexyl ether, DOWANOL™ PM propylene glycol monomethyl ether, DOWANOL™ DPM dipropylene glycol monomethyl ether, DOWANOL™ TPM tripropylene glycol monomethyl ether, DOWANOL™ PMA propylene glycol methyl ether acetate, DOWANOL™ DPMA dipropylene glycol methyl ether acetate, DOWANOL™ PnP propylene glycol n-propyl ether, DOWANOL™ DPnP dipropylene glycol n-propyl ether, DOWANOL™ PnB propylene glycol n-butyl ether, DOWANOL™ DPnB dipropylene glycol n-butyl ether, DOWANOL™ TPnB tripropylene glycol n-butyl ether, DOWANOL™ PPh propylene glycol phenyl ether, DOWANOL™ PGDA propylene glycol diacetate, PROGLYDE™ DMM dipropylene glycol dimethyl ether, and Butyl CARBITOL™ Acetate diethylene glycol n-butyl ether acetate.

The second component can consist of one or more glycol ethers. In one embodiment the second component consists of one glycol ether. In one embodiment the second component consists of two or more glycol ethers. In one embodiment the second component is an ethylene glycol alkyl ether. In one embodiment the second component is a propylene glycol alkyl ether. In one embodiment the alkyl component of the ethylene or propylene glycol ether is an alkyl group of 2 to 12, or 3 to 10, or 3 to 8, carbon atoms. In one embodiment the second component consists of, or is, diethylene glycol monoethyl ether (CAS Number 111-90-0).

In some embodiments, solvents of the present invention comprise or consist essentially of 20 to 30 weight percent glycol ether. Solvents of the present invention, in other embodiments, comprise or consist essentially of 22 to 28 weight percent glycol ether.

In some embodiments, the solvent consists of diethylene glycol monoethyl ether. In some such embodiments, the solvent consists of 20 to 30 weight percent diethylene glycol monoethyl ether. The solvent consists of 22 to 28 weight percent diethylene glycol monoethyl ether in some embodiments.

(3) Ether Ester

The third component of the solvent for agricultural applications (e.g., pesticides) of the present invention consists of, or is, an ether ester of Formula 1:

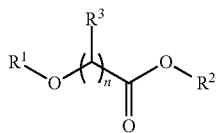

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6. In some embodiments, $R^1$ and $R^2$ are ethyl groups, $R^3$ is hydrogen, and n is 2.

In one embodiment the ether ester is ethyl-3-ethoxy propionate and is commercially available from The Dow Chemical Company as UCAR™ Ester EEP.

Solvents for agricultural applications of the present invention can comprise, consist of, or consist essentially of two or more ether esters of Formula 1. "Two or more ether esters of Formula 1" means that the solvent comprises at least two distinct ether esters of Formula 1 (e.g., a first ether ester in which $R^1$ and $R^2$ methyl and a second ether ester in which $R^1$ and $R^2$ are ethyl; or a first ether ester in which n is 2 and a second ether ester in which n is 3 and all other substituents or components of the two ether esters are the same; etc. The ether esters can differ from one another in more than one substituent or component, and the solvent can comprise any number of different ether esters of Formula 1.

In some embodiments, solvents of the present invention comprise 20 to 40 percent by weight of ether esters of Formula 1. Solvents of the present invention, in other embodiments, comprise 25 to 35 weight percent of ether esters of Formula 1.

In some embodiments, the third component of solvents of the present invention consists of 20 to 40 weight percent of ether esters of Formula 1. The third component consists of 25 to 35 weight percent of ether esters of Formula 1 in some embodiments.

Solvents of the present invention are made using known equipment and known techniques. The individual components of the solvent are commercially available, liquid at ambient conditions (23° C. and atmospheric pressure), and can simply be mixed with one another using conventional mixing equipment and standard blending protocols. The components can be added to one another in any order including simultaneously.

In one embodiment the solvent is a blend consisting of, or consisting essentially of, a sulfoxide as the first component, a glycol ether as the second component, and the ether ester of Formula 1 (as described above) as the third component.

In one embodiment the solvent is a blend consisting of, or consisting essentially of, a sulfoxide as the first component, diethylene glycol monoethyl ether as the second component, and the ether ester of Formula 1 (as described above) as the third component.

In one embodiment the solvent is a blend consisting of, or consisting essentially of, a sulfoxide as the first component, a glycol ether as the second component, and ethyl 3-ethoxypropionate as the third component.

In one embodiment the solvent is a blend consisting of, or consisting essentially of, a sulfoxide as the first component, diethylene glycol monoethyl ether as the second component, and ethyl 3-ethoxypropionate as the third component.

In one embodiment the solvent is a blend consisting of, or consisting essentially of, a dimethyl sulfoxide as the first component, a glycol ether as the second component, and the ether ester of Formula 1 (as described above) as the third component.

In one embodiment the solvent is a blend consisting of, or consisting essentially of, a dimethyl sulfoxide as the first component, diethylene glycol monoethyl ether as the second component, and the ether ester of Formula 1 (as described above) as the third component.

In one embodiment the solvent is a blend consisting of, or consisting essentially of, a dimethyl sulfoxide as the first component, a glycol ether as the second component, and ethyl 3-ethoxypropionate as the third component.

In one embodiment the solvent is a blend consisting of, or consisting essentially of, a dimethyl sulfoxide as the first component, diethylene glycol monoethyl ether as the second component, and ethyl 3-ethoxypropionate as the third component.

In one embodiment the solvent is a blend consisting of, or consisting essentially of, N-methyl-2-pyrrolidone as the first component, a glycol ether as the second component, and the ether ester of Formula 1 (as described above) as the third component.

In one embodiment the solvent is a blend consisting of, or consisting essentially of, N-methyl-2-pyrrolidone as the first component, diethylene glycol monoethyl ether as the second component, and the ether ester of Formula 1 (as described above) as the third component.

In one embodiment the solvent is a blend consisting of, or consisting essentially of, N-methyl-2-pyrrolidone as the first component, a glycol ether as the second component, and ethyl 3-ethoxypropionate as the third component.

In one embodiment the solvent is a blend consisting of, or consisting essentially of, N-methyl-2-pyrrolidone as the first component, diethylene glycol monoethyl ether as the second component, and ethyl 3-ethoxypropionate as the third component.

In one embodiment the solvent is a blend consisting of, or consisting essentially of, γ-butyrolactone as the first component, a glycol ether as the second component, and the ether ester of Formula 1 (as described above) as the third component.

In one embodiment the solvent is a blend consisting of, or consisting essentially of, γ-butyrolactone as the first component, diethylene glycol monoethyl ether as the second component, and the ether ester of Formula 1 (as described above) as the third component.

In one embodiment the solvent is a blend consisting of, or consisting essentially of, γ-butyrolactone as the first component, a glycol ether as the second component, and ethyl 3-ethoxypropionate as the third component.

In one embodiment the solvent is a blend consisting of, or consisting essentially of, γ-butyrolactone as the first component, diethylene glycol monoethyl ether as the second component, and ethyl 3-ethoxypropionate as the third component.

Regarding the relative amounts of the solvent components in solvents for agricultural applications wherein the solvent comprises, or consists of, a polar solvent, a glycol ether and an ether ester of Formula 1, in some embodiments, the weight ratio of the polar solvent to the glycol ether to the ether ester (polar solvent:glycol ether:ether ester) is 0.8-2.0: 1.0:1.0-2.0. In some embodiments wherein the solvent comprises, or consists of, dimethyl sulfoxide, glycol ether, and an ether ester of Formula 1, the weight ratio of dimethyl sulfoxide to the glycol ether to the ether ester (dimethyl sulfoxide:glycol ether:ether ester) is 0.8-2.0:1.0:1.0-2.0. In some embodiments wherein the solvent comprises, or consists of, dimethyl sulfoxide, diethylene glycol monoethyl ether, and an ether ester of Formula 1, the weight ratio of dimethyl sulfoxide to the diethylene glycol monoethyl ether to the ether ester (dimethyl sulfoxide:diethylene glycol monoethyl ether:ether ester) is 0.8-2.0:1.0:1.0-2.0. In some embodiments wherein the solvent comprises, or consists of, dimethyl sulfoxide, diethylene glycol monoethyl ether, and ethyl-3-ethoxy propionate, the weight ratio of dimethyl sulfoxide to the diethylene glycol monoethyl ether to the ethyl-3-ethoxy propionate (dimethyl sulfoxide:diethylene glycol monoethyl ether:ethyl-3-ethoxy propionate) is 0.8-2.0:1.0:1.0-2.0.

Pesticide Formulations

Solvents according to embodiments of the present invention can be used in a number of agricultural applications. In some embodiments, solvents of the present invention are useful in forming pesticide formulations of the present invention. Pesticide formulations according to the present invention comprise a pesticide and a solvent according to any of the embodiments of solvents for pesticides disclosed herein. These pesticides include, but are not limited to, one or more of tebuconazole, difenoconazole, triazolone, quizalofop-p-ethyl, myclobutanil, and pyraclostrobin.

In some embodiments, a pesticide formulation comprises 10 to 98 weight of a solvent according to any of the solvents for pesticides disclosed herein and 2 to 90 weight percent of the pesticide, each based on the total weight of the formulation. In some embodiments, a pesticide formulation comprises 20 to 80 weight of the solvent and 20 to 80 weight percent of the pesticide, each based on the total weight of the formulation.

In some embodiments, a pesticide formulation consists of 10 to 98 weight of a solvent according to any of the solvents for pesticides disclosed herein and 2 to 90 weight percent of the pesticide, each based on the total weight of the formulation. In some embodiments, a pesticide formulation consists of 20 to 80 weight of the solvent and 20 to 80 weight percent of the pesticide, each based on the total weight of the formulation.

In some embodiments, a pesticide formulation consists essentially of 10 to 98 weight of a solvent according to any of the solvents for pesticides disclosed herein and 2 to 90 weight percent of the pesticide, each based on the total weight of the formulation. In some embodiments, a pesticide formulation consists essentially of 20 to 80 weight of the solvent and 20 to 80 weight percent of the pesticide, each based on the total weight of the formulation.

In one embodiment, a pesticide formulation comprises 16 to 55 weight percent polar solvent, 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a polar solvent comprising a sulfoxide, N-methyl-2-pyrrolidone, γ-butyrolactone, or a combination thereof, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a polar solvent comprising a sulfoxide, N-methyl-2-pyrrolidone, γ-butyrolactone, or a combination thereof, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a sulfoxide, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a sulfoxide, from 20 to 30 weight percent of diethylene glycol monoethyl ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a sulfoxide, from 20 to 30 weight percent of a glycol ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of a sulfoxide, from 20 to 30 weight percent of diethylene glycol monoethyl ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of a polar solvent comprising dimethyl sulfoxide, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of a polar solvent comprising dimethyl sulfoxide, from 20 to 30 weight percent of diethylene glycol monoethyl ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of a polar solvent comprising dimethyl sulfoxide, from 20 to 30 weight percent of a glycol ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of a polar solvent comprising dimethyl sulfoxide, from 20 to 30 weight percent of diethylene glycol monoethyl ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of N-methyl-2-pyrrolidone, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of N-methyl-2-pyrrolidone, from 20 to 30 weight percent of diethylene glycol monoethyl ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of N-methyl-2-pyrrolidone, from 20 to 30 weight percent of a glycol ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent based on the weight of the pesticide formulation, from 16 to 55 weight percent of N-methyl-2-pyrrolidone, from 20 to 30 weight percent of diethylene glycol monoethyl ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of γ-butyrolactone, from 20 to 30 weight percent of a glycol ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of γ-butyrolactone, from 20 to 30 weight percent of diethylene glycol monoethyl ether, 20 to 40 weight percent of an ether ester of Formula 1 (as described above), and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of γ-butyrolactone, from 20 to 30 weight percent of a glycol ether, 20 to 40 weight percent of ethyl 3-ethoxypropionate, and 2 to 70 weight percent of a pesticide, each based on the total weight of the pesticide formulation.

In one embodiment, a pesticide formulation consist of, or consists essentially of, in weight percent (wt %) based on the weight of the pesticide formulation, from 16 to 55 weight percent of γ-butyrolactone, from 20 to 30 weight percent of diethylene glycol monoethyl ether, 20 to 40 weight percent of ethyl 3-ethoxypropionate, and 2 to 70 weight percent of a pesticide, each based on the total weight of the pesticide formulation.

Optional materials that are not essential to the operability of, but can be included in, the pesticide formulations of this invention include, but are not limited to, antioxidants, colorants, water scavengers, stabilizers, and the like. These materials do not have any material impact on the efficacy of the pesticide formulation. These optional materials are used in known amounts, e.g., 0.10 to 5, or 4, or 3, or 2, or 1, weight percent based on the weight of the solvent, and they are used in known ways.

Pesticide formulations can be prepared using techniques known to those of skill in the art. For example, the active ingredient (pesticide) can be dissolved in a solvent, and then emulsifiers or other conventional additives can be added.

Some embodiments of the invention will now be described in detail in the following Examples.

EXAMPLES

The following examples are given to illustrate the invention and should not be construed as limiting its scope. All parts and percentages are by weight unless otherwise indicated.

The following components in Table 1 are evaluated for performance as a solvent for pesticides:

TABLE 1

| Component | Chemical |
| --- | --- |
| Polar Solvent (Polar Component) | Dimethyl sulfoxide (DMSO) |
| Bridging Solvent (Glycol Ether) | diethylene glycol monoethyl ether |
| Non-polar Solvent (Ether Ester of Formula 1) | ethyl 3-ethoxypropionate |

The DMSO is from Sinopharm, Co., China. The diethylene glycol monoethyl ether is CARBITOL™ from The Dow Chemical Company. The ethyl 3-ethoxypropionate is UCAR™~ Ester EEP available from The Dow Chemical Company. The following solvents are evaluated:

TABLE 2

| Solvent | Chemical |
| --- | --- |
| Comparative Solvent A | Dimethyl sulfoxide (DMSO) |
| Comparative Solvent B | diethylene glycol monoethyl ether |
| Comparative Solvent C | ethyl 3-ethoxypropionate |
| Inventive Solvent 1 | 45 weight % DMSO |
| | 25 weight % diethylene glycol monoethyl ether |
| | 35 weight % ethyl 3-ethoxypropionate |

The solubility of various pesticides in these solvents are evaluated. The pesticides are shown in Table 3:

TABLE 3

| Components | Supplier |
| --- | --- |
| Tebuconazole | Liannong Chemical Co. (China) |
| Difenoconazole | Suli Chemical Co. (China) |
| Triazolone | Qizhou Chemical Co. (China) |
| Quizalofop-p-ethyl | Jingbo Chemical Co. (China) |
| Myclobutanil | Shengya Chemical Co. (China) |
| Pyraclostrobin | Shentai Chemical Co. (China) |

Each pesticide powder is added by solvent in 2% stepwise increments to the final pesticide concentration. Each pesticide reaches a concentration where the pesticide powder is not dissolved by the solvent. The concentration just prior to the concentration where the pesticide powder is not dissolved is shown in Table 4. Thus, the data in Table 4 reflects a solubility that is no more than 2% lower than the actual solubility.

TABLE 4

| Active Ingredients | Comparative Solvent A (weight %) | Comparative Solvent B (weight %) | Comparative Solvent C (weight %) | Inventive Solvent 1 (weight %) |
| --- | --- | --- | --- | --- |
| Tebuconazole | 32.3 | 26.5 | 16.0 | 38.0 |
| Difenoconazole | 39.0 | 35.0 | 33.0 | 43.0 |
| Triazolone | 43.3 | 35.7 | 32.0 | 47.0 |
| Quizalofop-p-ethyl | 16.5 | 15.3 | 22.0 | 23.0 |
| Myclobutanil | 56.7 | 46.0 | 39.0 | 57.0 |
| Pyraclostrobin | 40.0 | 33.0 | 47.0 | 50.0 |

As shown above, Inventive Solvent 1, which is a blend of Comparative Solvents A, B, and C exhibits a stronger dissolving power than each of the individual solvents for each of active ingredients that were evaluated. Inventive Solvent 1 thus provides a synergistic effect in terms of dissolving power. In addition, Inventive Solvent 1 effectively dissolves a variety of pesticides as shown in Table 4 and thus acts as a universal solvent for a variety of active ingredients (in this example, pesticides).

We claim:

1. A pesticide formulation comprising:
   (a) a polar solvent wherein the polar solvent is a sulfoxide, N-methyl-2-pyrrolidone, γ-butyrolactone, or a combination thereof;
   (b) a glycol ether;
   (c) an ether ester of Formula 1:

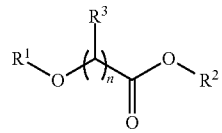

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and
   (d) a pesticide.

2. The pesticide formulation of claim 1, wherein the polar solvent comprises 16 to 55 weight percent of the formulation, wherein the glycol ether comprises 20 to 30 weight percent of the formulation, wherein the ether ester comprises 20 to 40 weight percent of the formulation, and wherein the pesticide comprises 2 to 70 weight percent of the formulation.

3. The pesticide formulation of claim 1, wherein the pesticide comprises one or more of tebuconazole, difenoconazole, triazolone, quizalofop-p-ethyl, myclobutanil, and pyraclostrobin.

4. A pesticide formulation comprising:
   (a) 16 to 55 weight percent of dimethyl sulfoxide;
   (b) 20 to 30 weight percent of glycol ether;
   (c) 20 to 40 weight percent of ether ester; and
   (d) 2 to 70 weight percent of pesticide.

* * * * *